Aug. 9, 1927.
C. A. HOPWOOD
1,638,807
DOUBLE CUTTING EDGE GOLF SICKLE OR SCYTHE
Original Filed Sept. 4, 1925
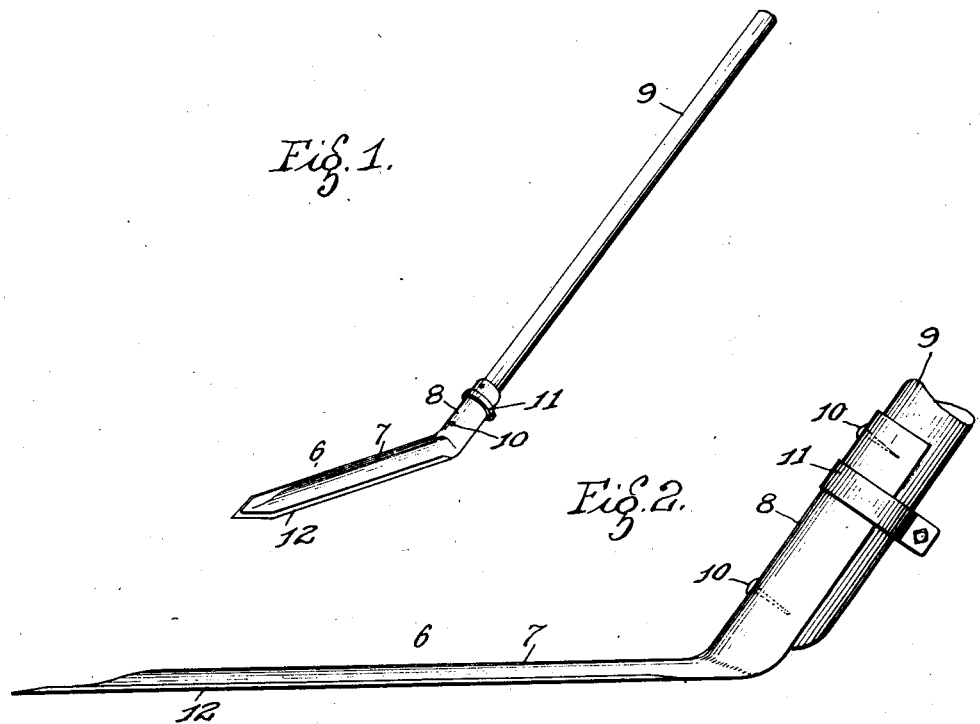
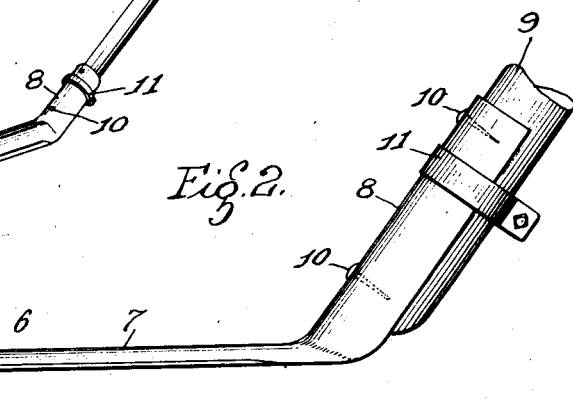
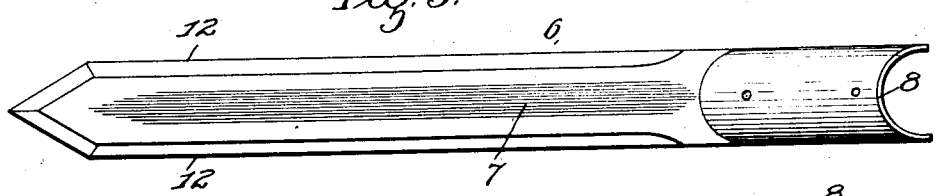
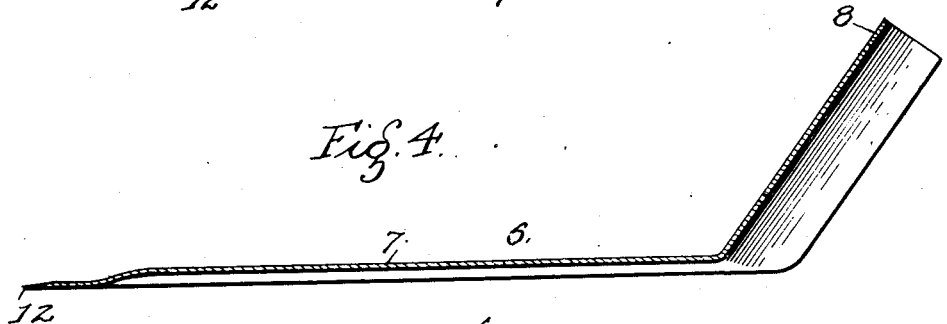
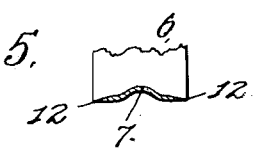
Inventor.
Charles A. Hopwood.

Patented Aug. 9, 1927.

1,638,807

UNITED STATES PATENT OFFICE.

CHARLES A. HOPWOOD, OF ST. LOUIS COUNTY, MISSOURI.

DOUBLE-CUTTING-EDGE GOLF SICKLE OR SCYTHE.

Application filed September 4, 1925. Serial No. 54,423. Renewed April 28, 1927.

This invention relates to improvements in a double cutting edge golf sickle or scythe, and has for its object an integral blade provided with a cutting edge all around, and said blade terminating into a handle receiving socket section.

The device is simple, constructed of a good quality of steel, is of sufficient length to be convenient, and the socket section is arranged at such angle to the blade portion so that when in use, the blade will be in proper horizontal relation with the ground so as to cut evenly.

Figure 1, is a perspective view of my invention.

Figure 2, is a side view of the same.

Figure 3, is a top plan view.

Figure 4, is a central sectional view taken midway of its length.

Figure 5, is a cross section of the blade.

Referring to the drawing in detail 6 indicates a blade constructed preferably of a flat strip of steel its center portion suitably pressed outwardly forming a stiffening rib 7 for the purpose of rigidity.

The one end of the blade is bent at a suitable angle and formed into a socket member 8 in which is securely fastened a handle 9, this handle held therein by screws 10 or the like, and an additional securing band 11.

The complete edge of the blade is beveled off forming a cutting edge 12, and by means of this cutting edge the blade will cut as the sickle is swung in either direction.

This device is very convenient for regular lawn cutting purposes, and can be carried by golfers to clear a spot should the ball roll into some high weeds or underbrush.

Having fully described my invention what I claim is:

1. A sickle or scythe comprising a blade consisting of a horizontal portion and a semi-circular socket portion formed integral with and extending at an angle from the horizontal portion, the entire edge of the horizontal portion sharpened for cutting purposes, and a clamp for holding a handle in the socket portion.

2. A sickle or scythe comprising a blade of durable material, the entire edge being beveled and ground to a cutting edge, the blade provided with a stiffening rib for rigidity, and a semi-circular socket formed integral with the blade, and arranged at an angle for the reception of a handle.

3. A device of the character described comprising a strip of durable sheet material, the same comprising a blade, a portion thereof terminating into a semi-circular socket, a cutting edge formed all around the blade so that said blade will cut when the same is swung in both directions, said blade formed with a stiffening rib for the purpose of rigidity, and a clamp for securing the sickle to a handle substantially as specified.

In witness whereof I hereunto set my hand.

CHARLES A. HOPWOOD.